United States Patent
Reyes Luna

(10) Patent No.: US 9,216,676 B1
(45) Date of Patent: Dec. 22, 2015

(54) SEAT ASSEMBLY WITH DISPLACEABLE NECKREST AND NECK SUPPORT

(71) Applicant: FORD GLOBAL TECHNOLOGIES, LLC, Dearborn, MI (US)

(72) Inventor: Rodolfo Reyes Luna, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/329,286

(22) Filed: Jul. 11, 2014

(51) Int. Cl.
*B60R 21/055* (2006.01)
*A47C 7/38* (2006.01)
*B60N 2/48* (2006.01)

(52) U.S. Cl.
CPC .............. *B60N 2/487* (2013.01); *B60N 2/4802* (2013.01); *B60N 2/4882* (2013.01)

(58) Field of Classification Search
CPC ..... B60N 2/487; B60N 2/4802; B60N 2/4882
USPC ............... 297/112, 114, 188.01, 188.04, 392, 297/393, 487, 488
See application file for complete search history.

(56) References Cited

U.S. PATENT DOCUMENTS

| | | | | |
|---|---|---|---|---|
| 2,136,852 A * | 11/1938 | Knauth | ...................... | 297/488 X |
| 2,172,797 A * | 9/1939 | Lewallen | ..................... | 297/392 |
| 2,306,334 A * | 12/1942 | Costas | .......................... | 297/407 |
| 2,584,481 A * | 2/1952 | Mast et al. | ..................... | 297/115 |
| 2,973,030 A * | 2/1961 | Matthewson | ................. | 297/393 |
| 3,466,091 A * | 9/1969 | Grusso | .......................... | 297/486 |
| 3,713,694 A * | 1/1973 | Miller | ............................ | 297/486 |
| 3,761,126 A * | 9/1973 | Mulholland | .............. | 297/391 X |
| 3,764,180 A * | 10/1973 | Mulholland | .............. | 297/488 X |
| 3,888,540 A * | 6/1975 | Protze et al. | ............. | 297/391 X |
| 3,901,550 A * | 8/1975 | Hamy | ........................ | 297/488 X |
| 4,230,366 A * | 10/1980 | Ruda | ............................ | 297/487 |
| 4,285,081 A * | 8/1981 | Price | ........................ | 297/393 X |
| 4,749,229 A * | 6/1988 | Dorto | ........................ | 297/488 X |
| 4,913,498 A * | 4/1990 | Forlivio | ......................... | 297/488 |
| 5,026,118 A * | 6/1991 | Vander Stel et al. | ...... | 297/488 X |
| 5,100,199 A * | 3/1992 | Vander Stel et al. | ...... | 297/488 X |
| 5,108,150 A | 4/1992 | Stas et al. | | |
| 5,294,182 A * | 3/1994 | Colasanti | ................... | 297/391 X |
| 5,370,446 A * | 12/1994 | Bancod | ........................ | 297/408 |
| 5,531,505 A * | 7/1996 | Baetz et al. | .................. | 297/408 |
| 5,791,735 A * | 8/1998 | Helman | ........................ | 297/407 |
| 6,116,691 A * | 9/2000 | Reece | ............................ | 297/392 |
| 6,616,235 B1 | 9/2003 | Khavari et al. | | |
| 6,786,554 B1 * | 9/2004 | Zahiri | ........................... | 297/393 |

(Continued)

FOREIGN PATENT DOCUMENTS

DE    102004049300    *    4/2006    ..........    B60N 2/4882
EP    1580067 A1    9/2005

(Continued)

*Primary Examiner* — Rodney B White
(74) *Attorney, Agent, or Firm* — Vichit Chea; King & Schickli, PLLC

(57) ABSTRACT

A seat assembly for a motor vehicle includes a seat body having a seating surface and a storage cavity. A headrest is carried on the seat body. Further a neckrest is pivotally attached to the seat body. The neckrest is selectively displaceable between the storage position in a cavity of the seat body and a deployed position above the seating surface. In one possible embodiment the seat assembly also includes a neck support that may be displayed with the neckrest between storage and deployed positions.

17 Claims, 5 Drawing Sheets

(56) References Cited

U.S. PATENT DOCUMENTS

| | | | |
|---|---|---|---|
| 6,971,316 B2 * | 12/2005 | Hansen et al. | 297/488 X |
| 7,204,557 B1 | 4/2007 | Burton | |
| 7,213,877 B2 * | 5/2007 | Gramss | 297/188.04 X |
| 7,261,381 B2 * | 8/2007 | Tsai | 297/488 |
| 7,887,140 B1 * | 2/2011 | Forlivio | 297/488 |
| 7,908,692 B2 * | 3/2011 | Lange | 5/636 |
| 8,342,606 B2 * | 1/2013 | Le Texier et al. | 297/408 |
| 8,418,293 B2 * | 4/2013 | Tansingco | 297/393 X |
| 8,911,018 B2 * | 12/2014 | Gaither et al. | 297/391 |
| 8,967,717 B2 * | 3/2015 | Sims | 297/487 X |
| 8,985,622 B1 * | 3/2015 | Cannon | 297/391 |
| 2002/0084686 A1 * | 7/2002 | Takata | 297/408 |
| 2002/0195868 A1 * | 12/2002 | Tsai | 297/487 |
| 2012/0007405 A1 | 1/2012 | Kim | |
| 2012/0139309 A1 | 6/2012 | Gaither et al. | |
| 2013/0187428 A1 | 7/2013 | Albino | |
| 2015/0197170 A1 * | 7/2015 | Obukhov | B60N 2/4882 |

FOREIGN PATENT DOCUMENTS

| | | | | |
|---|---|---|---|---|
| FR | 2739813 A1 * | 4/1997 | | B60N 2/48 |
| FR | 2812594 A1 * | 2/2002 | | B60N 2/48 |
| JP | 2010022764 A | 2/2010 | | |
| WO | 2012168804 A1 | 12/2012 | | |
| WO | 2013188371 A1 | 12/2013 | | |
| WO | WO 2013188371 A1 * | 12/2013 | | B60N 2/4882 |

* cited by examiner

SEAT ASSEMBLY WITH DISPLACEABLE NECKREST AND NECK SUPPORT

TECHNICAL FIELD

This document relates generally to the motor vehicle field and, more particularly, to a new and improved seat assembly incorporating a displaceable neckrest and neck support.

BACKGROUND

A standard motor vehicle seat is equipped with a headrest to support the back of the head of a passenger sitting in the seat. Unfortunately, a standard headrest fails to provide any side and back (cervical) support. Accordingly, when a passenger intends to take a nap while sitting in the seat, the head of the passenger has a tendency to drop to one side. This can wake the passenger or, alternatively lead to discomfort including, particularly, a sore and stiff neck when the passenger awakes.

This document relates to an improved seat assembly incorporating both a neckrest to support the head on each side and a projecting neck support to support the back of the neck when a passenger desires to nap or simply enjoy additional comfort while occupying the vehicle seat.

SUMMARY

In accordance with the purposes and benefits described herein, a seat assembly is provided for a motor vehicle. The seat assembly comprises (a) a seat body, including a seating surface and a storage cavity, (b) a headrest carried on the seat body and (c) a neckrest pivotally attached to the seat body and selectively displaceable between a storage position in the cavity and a deployed position above the seating surface.

More specifically, the seat body includes a seat back having a front face and a rear face. The storage cavity is provided in the rear face. Still further, the neckrest comprises two arms with one arm on each side of the headrest. A switch is connected to the seat assembly. Activation of the switch displaces the neckrest from the storage position to the deployed position.

In one possible embodiment a spring is provided for biasing the neckrest into the deployed position and a lock is provided for securing the neckrest in the storage position. Accordingly, when the switch is depressed, the lock is released and the spring biases the arms of the neckrest into the deployed position where they project forwardly over the seating surface on each side of the headrest and function to support the passenger's head if it rocks to either side thereby limiting that motion.

In an alternative embodiment a drive motor is provided for displacing the neckrest between the storage and deployed positions and the activation switch controls that drive motor.

Still further, the seat assembly includes a neck support between the two arms and below the headrest. The neck support includes a cushion displaceable between a storage position and a deployed position wherein the cushion projects forward from the seat back. A mechanical linkage is provided between the neck support and the neckrest so that the two may be displaced between the deployed and storage positions together. More specifically, the neckrest includes a pivot shaft and the mechanical linkage includes a pinion keyed to the pivot shaft and a cooperating rack connected to the cushion and engaged by the pinion whereby as the neckrest is deployed the pinion is turned to translate the rack and deploy the cushion.

In one possible embodiment a storage compartment is provided for the neck support. The storage compartment has a recess for holding the neck support when the neck support is in the storage position. The storage compartment is located adjacent the top of the seat back. In one possible embodiment the activation button is also mounted to the seat body adjacent the top of the seat back.

In the following description, there is shown and described several preferred embodiments of the seat assembly. As it should be realized, the seat assembly is capable of other, different embodiments and its several details are capable of modification in various, obvious aspects all without departing from the seat assembly as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the seat assembly and together with the description serve to explain certain principles thereof. In the drawings.

Reference will now be made in detail to the present preferred embodiment of the seat assembly, examples of which are illustrated in the accompanying drawings.

DETAILED DESCRIPTION

Figure 1:
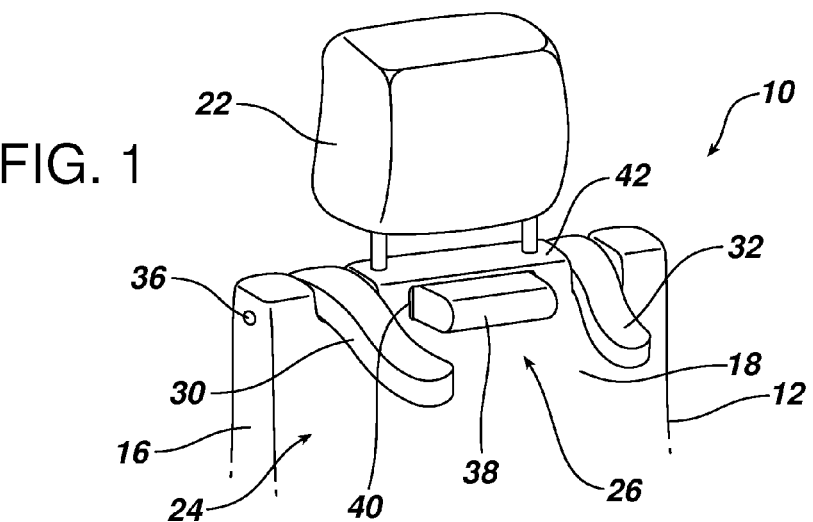
FIG. 1 is a detailed perspective view illustrating the seat assembly with the neckrest and neck support both in the deployed position.
Figure 2:
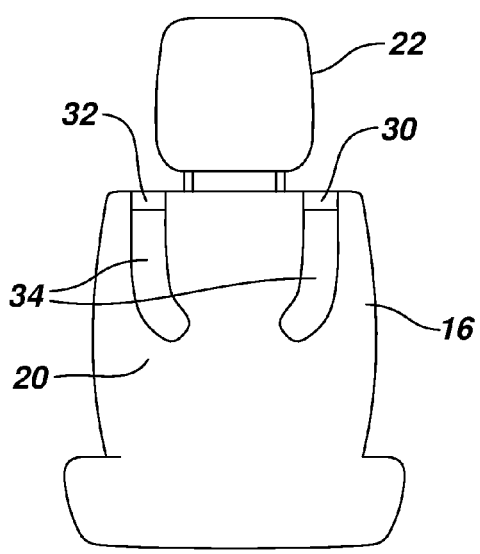
FIG. 2 is a rear elevational view of the seat assembly showing the contoured cavity in which the two arms of the neckrest are received when the neckrest is in the storage position.
Figure 3:
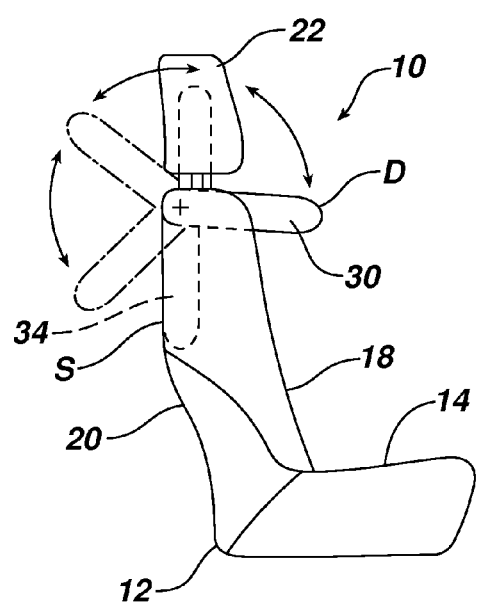
FIG. 3 is a side elevational view illustrating the pivotal movement of the neckrest between the storage and deployed positions.

Reference is now made to FIGS. 1-3 illustrating the seat assembly 10 which incorporates a seat body 12 having a seating surface 14 and a seat back 16. The seat back 16 includes a front face 18 and a rear face 20. The headrest 22 is attached to the top of the seat back 16 and may allow for height adjustment in any manner well known with respect to the headrest art.

The seat assembly 10 also includes a neckrest 24 and a neck support 26. Both the neckrest 24 and the neck support 26 are selectively displaceable between a storage position and a deployed position as will be described in greater detail below.

The neckrest 24 comprises two cooperating arms 30, 32 that are pivotally mounted to the seat back 16 with one on each side of the headrest 22. A storage cavity 34 is provided in the rear face 20 of the seat back 16. As should be appreciated, the storage cavity 34 is contoured to receive and hold both of the arms 30, 32 when they are in the storage position (see particularly FIGS. 2 and 3).

A control switch 36 is provided on the upper shoulder of the seat back 16. When the switch 36 is depressed, the neckrest arms 30, 32 pivot from the storage position S to the deployed position D (note action arrows in FIG. 3). As illustrated in FIGS. 1 and 3, when deployed, the neckrest arms 30, 32 project forwardly over the seating surface 14 on each side of the headrest 22 so that they may comfortably support the head of the passenger on the headrest when that passenger desires to take a nap or enjoy additional passenger comfort during the trip.

As will be further described below, the neck support 26 is mechanically linked to the neckrest 24 and is also displaceable with the neckrest arms 30, 32 between a storage position wherein the cushion 38 of the neck support is received and held in a recess 40 of the storage compartment 42 and a deployed position wherein the neck support cushion 38 projects forwardly from the front face 18 of the seat back 16 to provide cushioned support for the rear of the neck of a napping passenger whose head is resting on the headrest 22. Thus, while the neckrest arms 30, 32 prevent the head of the napping seat occupant from falling to the sides, the neck support cushion 38 simultaneously provides support to the rear of the neck to maximize his comfort so that the seat occupant may awaken refreshed and without a stiff or sore neck.

Figure 4:
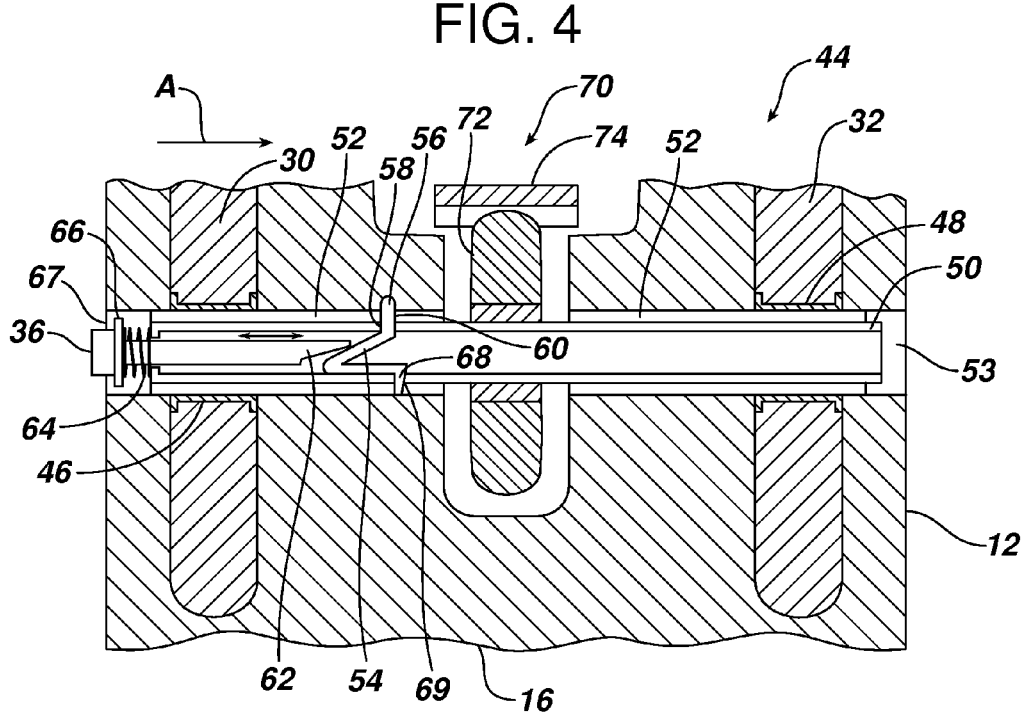
FIG. 4 is a schematical cross-sectional view illustrating the mechanism for operating the neckrest and the mechanical linkage for connecting the neckrest to the neck support.
Figure 5:
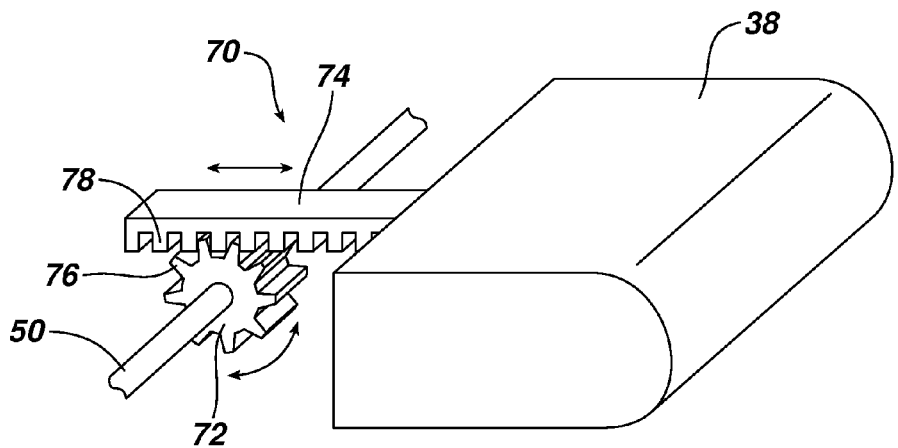
FIG. 5 is a detailed schematical perspective view illustrating the pinion and translating rack of that mechanical linkage.
Figure 6:
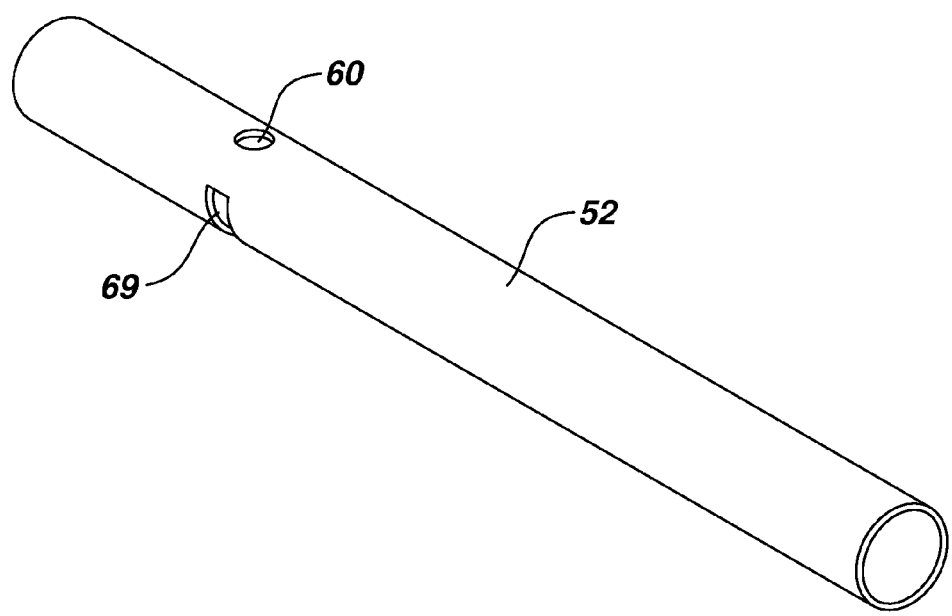
FIG. 6 is a detailed perspective view of the fixed cylinder in which the rotary cylinder turns.

Reference is now made to FIGS. 4-6 illustrating the details of the mechanical mechanism 44 for operating the neckrest 24 and neck support 26.

As best illustrated in FIG. 4, the neckrest arms 30, 32 are connected by respective connectors 46, 48 to a rotary cylinder 50 which is concentrically received within the fixed split cylinder 52 and the bearing end cap 53. The cylinder 52 is fixed in the seat back 16 by molding in place, by pins or other appropriate means. The mechanism 44 also includes a linear spring 54 having an integral pin 56. As illustrated, the linear spring 54 is mounted in the rotary cylinder 50 with the pin 56 extending through an aperture 58 in the rotary cylinder. When locked in position the pin 56 also extends into an aligned aperture 60 provided in the fixed cylinder 52 corresponding to the fully deployed position D of the arms 30, 32. More than one aperture 60 may be provided in the fixed cylinder 52 if it is desired to be able to lock the arms 30, 32 into more than one position. Thus, another aperture may be provided in the fixed cylinder 52 which corresponds to the storage position. There may also be another aperture for one or more intermediate positions between the storage and fully deployed positions.

As further illustrated in FIG. 4, the control switch 36 includes an integral pin 62. When the control switch 36 is depressed in the direction of action arrow A, the end of the pin 62 engages the linear spring 54 withdrawing the pin 56 from the aperture 60 in the cylinder 52 so that the rotary cylinder 50 may be rotated in the fixed cylinder 52 to bring the arms 30, 32 into any desired position. When the control switch 36 is released, the helical spring 64 returns the control switch 36 to the home position (note flange 66 on switch 36 which engages margin 67 of seat body 12 to retain the control switch in position). Simultaneously, the linear spring 54 biases the pin 56 back into the new aligned aperture 60 in the cylinder 52 to lock the arms 30, 32 in position. Here it should be noted that the stopper 68 functions to continuously engage a slot 69 in the fixed cylinder 52 (see FIG. 6) which limits the range of pivotal rotation of the cylinder 50 and therefore the arms 30, 32 to an arc defined between the storage and fully deployed positions.

As should be further appreciated from reviewing FIGS. 4 and 5, a mechanical linkage, generally designated by reference numeral 70, connects the neck support 26 with the neckrest 24 so that both are displaced together between the storage and deployed positions. More specifically, the mechanical linkage 70 comprises a pinion 72 keyed to the rotary cylinder 50 and a cooperating rack 74 connected to the neck support cushion 38. As best illustrated in FIG. 5, the teeth 76 on the pinion 72 mesh with the teeth 78 on the rack 74 so that as the rotary cylinder 50 turns, the rack 74, and the neck support cushion 38 connected thereto undergo a linear translation thereby allowing the cushion to be moved between the storage position wherein it is partially set back into the recess 40 of the storage compartment 42 under the headrest 22 and the deployed position wherein the cushion projects forwardly from the front face 18 of the seat back 16 to provide support to the rear of the neck of the passenger sitting in the seat assembly 10.

As should be appreciated in the embodiment illustrated in FIGS. 1-5, the neckrest 24 and neck support 26 are manually deployed by the individual depressing the control switch 36 and manually manipulating the arms 30, 32 into the deployed position D where they may be locked into position.

Figure 7A:
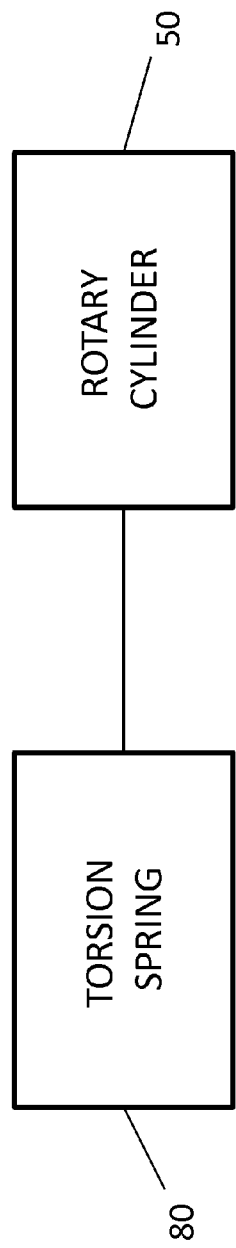
FIG. 7a is a schematical representation of one possible embodiment of seat assembly incorporating a torsion spring for biasing the neckrest and optional neck support into the deployed positions.
Figure 7B:
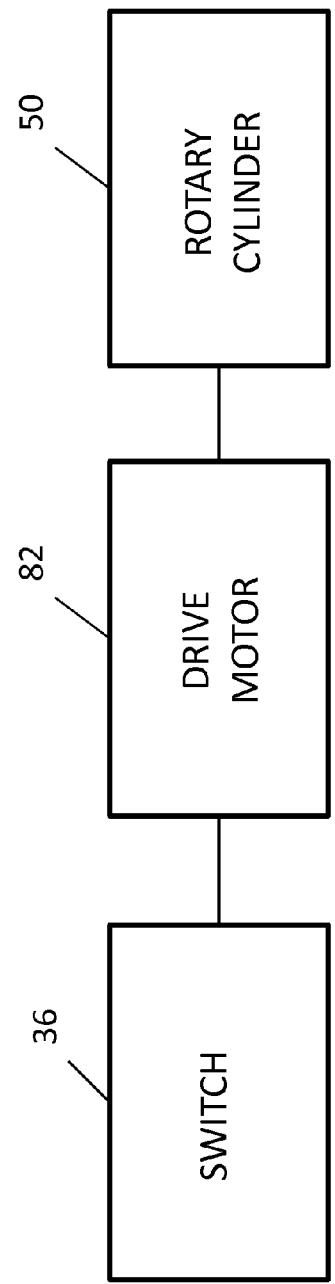
FIG. 7b is a schematical illustration of yet another embodiment incorporating a drive motor for displacing the neckrest and optional neck support between storage and deployed positions.

FIGS. 7a and 7b schematically illustrate two alternative embodiments. In the FIG. 7a embodiment, a torsion spring 80 is connected to the rotary cylinder 50 and functions to bias the rotary cylinder and, therefore, the neckrest arms 30, 32 and neck support cushion 38 into the fully deployed position. In this embodiment, the operator may return the neckrest 24 and neck support 26 to the storage position manually by using a sufficient level of force to overcome the biasing force of the torsion spring 80 and return the arms 30, 32 to the storage cavity 34 where the linear spring 54 locks them in position until they are released again by manipulation of the control switch 36.

In the alternative embodiment illustrated in FIG. 7b, a control switch 36 is connected to a drive motor 82, such as a stepper motor, which drives the rotary cylinder 50 between the storage and deployed positions. In this embodiment, infinite adjustment may be provided through manipulation of the control switch 36 which may be toggled in either of two directions to either deploy the neckrest 24 and neck support 26 into a desired use position or return the neckrest and neck support to the storage position.

Figure 7C:
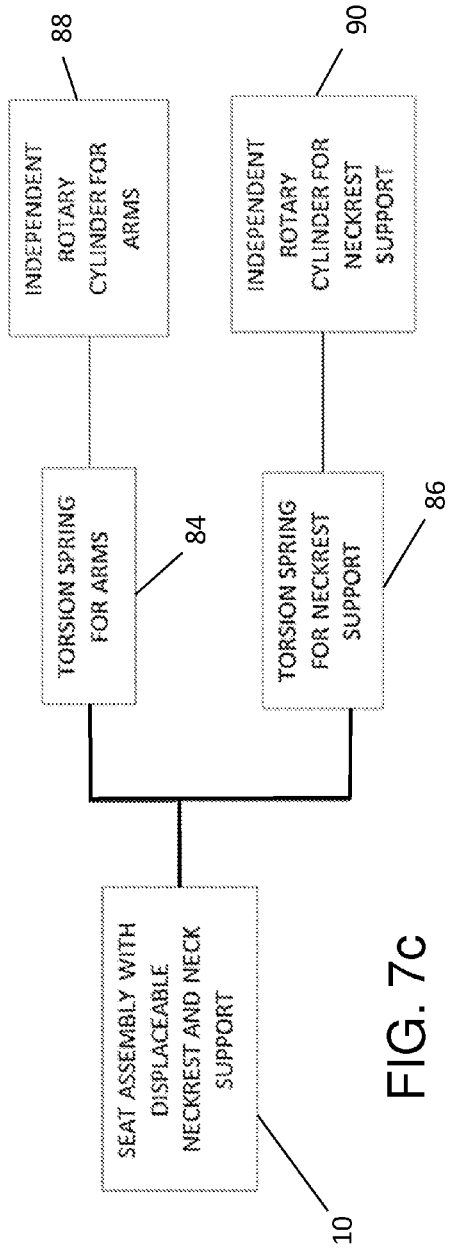
FIGS. 7c and 7d are schematical illustrations of still other embodiments of the seat assembly including independent controls for the arms and the support cushion.

In the alternative embodiment illustrated in FIG. 7c, a torsion spring 84 is provided to bias the arms 30, 32 of the neckrest 24 into the fully deployed position while a separate torsion spring 86 is provided to bias the neck support cushion 38. In this embodiment, the arms 30, 32 are connected to one rotary cylinder 88 while the neck rest support 26 is connected to another rotary cylinder 90. Thus, in this embodiment, the neck rest 24 and neck support 36 operate independently of one another.

Figure 7D:
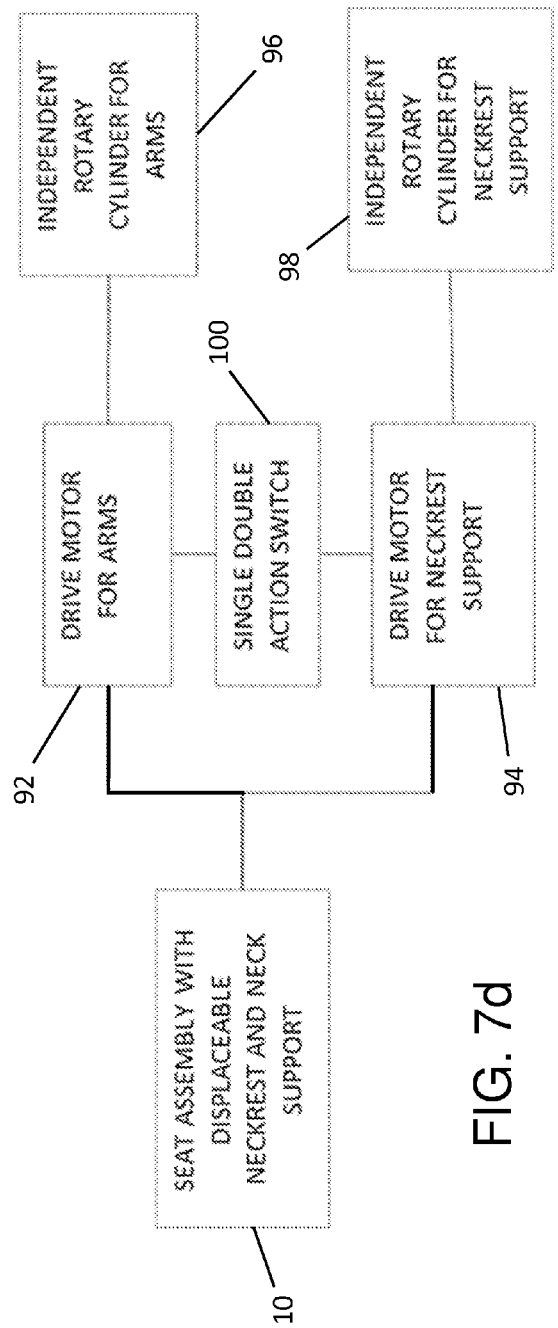

In the alternative embodiment illustrated in FIG. 7d, independent drive motors 92, 94 and independent rotary cylinders 96, 98 are provided for the neckrest 24 and neck support 26. A single double action switch 100 is used to selectively activate the drive motors 92, 94 to provide independent operations of (a) the arms 30, 32 of the neck rest 24 and the cushion 38 of the neck support 26.

In summary, numerous benefits result from employing the concepts disclosed in this document. The seat assembly 10 effectively provides a neckrest 24 which supports the head of a seat occupant properly on the headrest 22 thereby preventing the head from falling to either side. Simultaneously, the neck support 26 is deployed to provide comfort and support to the rear of the neck. Together these relieve neck strain on the seat occupant while he naps. When he awakes he is fully refreshed and any residual neck pain or stiffness from the nap is effectively eliminated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A seat assembly for a motor vehicle, comprising:
    a seat body including a seating surface, a seat back having a front face and a rear face and a storage cavity in said rear face;
    a headrest carried on said seat body; and
    a neckrest pivotally attached to said seat body and selectively displaceable between a storage position in said cavity and a deployed position above said seating surface.

2. The assembly of claim 1, wherein said neckrest comprises two arms, said headrest being positioned between said two arms.

3. The assembly of claim 2, further including a switch connected to said seat assembly, activation of said switch allowing displacement of said neckrest from said storage position to said deployed position.

4. The assembly of claim 3, further including a spring for biasing said neckrest into said deployed position and a lock for securing said neckrest in said storage position.

5. The assembly of claim 2, further including a drive motor for displacing said neckrest between said storage and deployed positions and an activation switch for controlling said drive motor.

6. The assembly of claim 2, further including a neck support between said two arms and below said headrest.

7. The assembly of claim 6, wherein said neck support includes a cushion displaceable between a storage position and a deployed position wherein said cushion projects forward from said seat back.

8. The assembly of claim 7, further including a mechanical linkage between said neck support and said neckrest.

9. The assembly of claim 8, wherein said neckrest includes a pivot shaft and said mechanical linkage includes a pinion keyed to said pivot shaft and a cooperating rack connected to said cushion and engaged by said pinion whereby as said neckrest is deployed said pinion is turned to translate said rack and deploy said cushion.

10. The assembly of claim 9, further including a drive motor for driving said pivot shaft and an activation switch for controlling said drive motor.

11. The assembly of claim 10, wherein said two arms are secured to said pivot shaft, said pivot shaft being held in said seat body while allowing relative rotation of said pivot shaft to said seat body.

12. The assembly of claim 11, further including a storage compartment for said neck support.

13. The assembly of claim 12, wherein said storage compartment includes a recess for holding said neck support when said neck support is in said storage position.

14. The assembly of claim 13, wherein said storage compartment is located adjacent a top of said seat back.

15. The assembly of claim 14, wherein said activation button is mounted to said seat body adjacent said top of said seat back.

16. A seat assembly for a motor vehicle, comprising:
    a seat body including a seat back and a seating surface;
    a headrest carried on said seat back;
    a neckrest pivotally attached to said seat back and selectively displaceable between a storage position and a deployed position;
    a neck support located below said headrest and also selectively displaceable between a storage position and a deployed position; and
    a mechanical linkage between said neck support and said neckrest wherein said neckrest includes a pivot shaft and said mechanical linkage includes a pinion keyed to said pivot shaft and a cooperating rack connected to a neck support cushion and engaged by said pinion whereby as said neckrest is deployed said pinion is turned to translate said rack and deploy said cushion.

17. The assembly of claim 16, further including a drive motor for driving said pivot shaft and an activation switch for controlling said drive motor.

* * * * *